Patented Dec. 8, 1931

1,835,052

UNITED STATES PATENT OFFICE

JESSE P. HUBBELL, OF FANWOOD, NEW JERSEY

METHOD OF PRODUCING HYDROCYANIC ACID GAS AND CYANOGEN COMPOUNDS

No Drawing.    Application filed March 23, 1923.   Serial No. 627,213.

One general object of the present invention is to provide an improved method of producing hydrocyanic acid gas. A second general object of my invention is to provide a novel and commercially economical method of producing relatively pure liquid hydrocyanic acid, alkaline cyanides, and other relatively valuable cyanogen compounds from relatively crude impure and inexpensive calcium cyanide, by first forming hydrocyanic acid gas out of the calcium cyanide, and then converting the hydrocyanic acid gas thus produced, into other valuable cyanogen compounds desired, by known or suitable methods for producing such compounds from hydrocyanic acid gas.

My novel method of producing hydrocyanic acid gas consists in exposing a known material containing calcium cyanide, to the action of an atmosphere which will cause a relatively rapid conversion of the calcium cyanide into hydrocyanic acid gas. The crude calcium cyanide containing product which I employ as the base material of my process is known as flaky calcium cyanide, and is a product of the electric furnace which, as ordinarily marketed, is in the form of relatively thin flakes which are grayish black in color. It is appreciably less deliquescent than sodium or potassium cyanide, and its physical structure as well as its chemical composition contributes to its comparatively rapid decomposition into hydrocyanic acid gas and hydrated lime and/or other calcium and sodium compounds when exposed to a suitable atmosphere. In the crude compound, the calcium cyanide is admixed with other materials, the nature and amount of which depend somewhat upon the method of manufacture and the relative proportions of the ingredients from which the crude product is made, and in a common commercial form, the crude product contains about 49 percent of calcium cyanide.

My invention is well adapted for the production of hydrocyanic acid gas for direct use as a fumigant to destroy rodents and to destroy bugs and parasites which injure vegetation. In a preferred mode of treating a tree to destroy scale or the like with hydrocyanic acid gas produced in accordance with the present invention, the tree is enclosed in the usual tent employed in fumigating trees with hydrocyanic acid, and the calcium cyanide may then be introduced into the tent and sprinkled on the ground around the tree. To effect the conversion of the calcium cyanide into hydrocyanic acid gas at a reasonably rapid rate, the humidity and/or acid content of the atmosphere must be higher than ordinarily obtained at times when hydrocyanic acid fumigation may be safely and efficiently carried on. The additional humidity may be obtained by wetting the ground either before or after the calcium cyanide is sprinkled on the ground. In this mode of treatment the flaky calcium cyanide may be sprinkled on the ground in its initial condition, or it may be crushed or powdered before being spread over the ground. In lieu of sprinkling the cyanide on the ground, it may be injected into the tent in powdered form, by means of a dust gun or the like, and in such case the atmosphere within the tent may be humidified to the desired extent by injecting steam into the tent, or by spraying water mist into the tent by means of an atomizer.

To accelerate the generation of hydrocyanic acid gas, in fumigating a tree in the manner described, I advantageously add to the atmosphere, suitable volatile acid constituents. For instance, I may add carbon dioxide, a constituent of carbonic acid usually present in the atmosphere in varying amounts which are ordinarily insufficient to give complete, or as rapid a rate of hydrocyanide gas generation as is desirable. In lieu of, or in addition to augmenting carbonic acid gas constituents of the atmosphere within the fumigating tent, I may add to the latter atomized acetic acid. Other volatile acids may be used, and while hydrochloric, sulphuric or nitric acids might be employed to accelerate the generation of hydrocyanic acid gas, such inorganic acids are, in general, not usable for fumigating purposes, whereas acetic acid and carbonic acid in the amounts required have no tendency to injure vegetation. In the appended claims the term "accelerator" is used to include and designate any and all of the substances just mentioned which may be added to the atmosphere in which hydrocyanic acid gas is liberated from calcium cyanide in order to increase the rate of liberation; and the term "weak accelerator" is used to include and designate an accelerator such as carbon dioxide or acetic acid less energetic than hydrochlorite, sulphuric, or nitric acids which I call "strong accelerators".

In treating trees in accordance with the present invention, as in other methods of treating them with hydrocyanic acid gas, moisture in the form of dew drops or rain drops on the leaves of trees at the time of treatment is objectionable since such drops of moisture absorb the gas and the tree may be injured or killed by the gas thus absorbed by the drops of moisture. To avoid injuring vegetation in this way I consider it ordinarily advisable in treating trees in accordance with the present invention to follow the usual practice in fumigating with hydrocyanic acid gas, and treat the trees only when the latter are comparatively dry, and at such times as the humidity of the general atmosphere is ordinarily relatively low. I depart from the usual practice, however, in artificially augmenting the humidity of the atmosphere to the desired degree if necessary. In practicing the present invention I consider the relatively high degree of humidity highly desirable if not essential to the desired rapidity of generation of hydrocyanic acid gas. In general, moreover, I consider it advantageous in fumigating with hydrocyanic acid however it may be generated, to operate with a humid atmosphere as I believe this improves the fumigation effect obtainable with a given amount of acid. An incidental advantage of a relatively high humidity in treating vegetation in cloth tents is that the moisture in the atmosphere tends to render the tent cloth less pervious to gas leakage. In general I consider it desirable that the moisture in the atmosphere should approach the saturation point but this point should not be reached and generally speaking, a considerable margin of safety is advisable. In ordinary practice I prefer that the moisture content of the atmosphere should be something like 75 percent of that required to produce saturation.

The quantity of calcium cyanide required in fumigation in accordance with the present invention, is that which will furnish about the same amount of hydrocyanic acid gas as would be required with the previously known methods of fumigating with hydrocyanic acid gas.

In destroying rodents such as gophers, for example, I place an ounce or two of calcium cyanide in the burrow or gopher hole, and then stop up the outlets from the burrow. Advantageously, straw, grass, or the like, is placed over the deposited calcium cyanide so that the earth used in closing the burrow will not cover the cyanide and interfere with the rapidity of decomposition. Ordinarily the atmosphere in the burrow is sufficiently high in carbonic acid and sufficiently humidified by the natural moisture in the earth to make artificial additions unnecessary. In case, however, the burrow is in very dry soil, some water may advantageously be poured into the burrow or on to the earth in immediate proximity thereto, or an acid employed to create the desired condition of the atmosphere in the burrow when the latter is stopped up after calcium cyanide has been placed therein.

In destroying rodents the character of the volatile acid constituents employed to accelerate the generation of hydrocyanic acid gas is in general immaterial except from the standpoint of cost and ease in procuring and handling such constituents.

In lieu of generating hydrocyanic acid gas within the enclosure in which the gas is to be used as a fumigant, I may subject the crude calcium cyanide to the action of a suitable atmosphere in a separate enclosure from which the gas generated is withdrawn for use elsewhere as a fumigant or for other purposes. In particular the hydrocyanic gas thus produced may be used in the commercial quantity production of relatively pure cyanogen compounds, such as liquid hydrocyanic acid and the alkaline cyanides by known or suitable methods for making such compounds from hydrocyanic acid gas. In the production of such compounds, the use of acetic acid as an accelerator has the special advantage that calcium sodium acetate is a resulting by-product of appreciable commercial value. The present application is in part a continuation of my prior application, Serial No. 520,587, filed December 7, 1921.

Having now described my invention, what I claim as new and desire to secure by Letters Patent, is:

1. The method of generating hydrocyanic acid gas which comprises the exposure of solid calcium cyanide in an air atmosphere containing some moisture and adding an accelerator to said atmosphere.

2. The method of generating hydrocyanic acid gas which comprises the exposure of solid calcium cyanide in an air atmosphere containing some moisture and adding a weak accelerator to said air.

3. The method of generating hydrocyanic acid gas which comprises the exposure of solid calcium cyanide to the action of atmospheric air and adding moisture and carbon dioxide to the air.

4. The method of generating hydrocyanic acid gas which comprises the exposure of solid calcium cyanide to the action of air atmosphere containing some moisture and adding volatilized acetic acid to said atmosphere.

5. The method of generating hydrocyanic acid gas which comprises the subjection of solid calcium cyanide to an atmosphere containing some moisture and a volatile acid radical constituent.

6. The method of producing a relatively pure cyanogen compound from calcium cyanide which comprises the exposure of said cyanide in solid form to a gaseous atmosphere containing moisture and an accelerator withdrawing the hydrocyanic acid gas liberated and forming the desired compound from said gas.

7. The method of producing a relatively pure cyanogen compound from calcium cyanide which comprises the exposure of said cyanide in solid form to a gaseous atmosphere containing moisture and a weak accelerator, withdrawing the hydrocyanic acid gas liberated and forming the desired compound from said gas.

8. The method of producing a relatively pure cyanogen compound from calcium cyanide which comprises the exposure of said cyanide in solid form to a gaseous atmosphere containing moisture and carbon dioxide, withdrawing the hydrocyanic acid gas liberated and forming the desired compound from said gas.

9. The method of producing a relatively pure cyanogen compound from calcium cyanide which comprises the exposure of said cyanide in solid form to a gaseous atmosphere containing moisture and acetic acid, withdrawing the hydrocyanic acid gas liberated and forming the desired compound from said gas.

Signed at New York city in the county of New York and State of New York this 20th day of March A. D. 1923.

JESSE P. HUBBELL.